US008615739B2

(12) United States Patent
Nir et al.

(10) Patent No.: US 8,615,739 B2
(45) Date of Patent: Dec. 24, 2013

(54) RESOURCE MONITORING

(75) Inventors: Dor Nir, Yehud (IL); Dror Saaroni, Yehud (IL); Ayal Cohen, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1043 days.

(21) Appl. No.: 12/428,733

(22) Filed: Apr. 23, 2009

(65) Prior Publication Data

US 2010/0275184 A1 Oct. 28, 2010

(51) Int. Cl.
G06F 9/44 (2006.01)
(52) U.S. Cl.
USPC ............................................ 717/124; 717/130
(58) Field of Classification Search
None
See application file for complete search history.

(56) References Cited

U.S. PATENT DOCUMENTS

| | | | |
|---|---|---|---|
| 6,023,507 A * | 2/2000 | Wookey | 709/224 |
| 6,560,564 B2 * | 5/2003 | Scarlat et al. | 702/186 |
| 6,564,342 B2 * | 5/2003 | Landan | 714/48 |
| 6,587,969 B1 * | 7/2003 | Weinberg et al. | 714/46 |
| 6,694,288 B2 * | 2/2004 | Smocha et al. | 702/186 |
| 6,738,933 B2 * | 5/2004 | Fraenkel et al. | 714/47.2 |
| 6,810,494 B2 * | 10/2004 | Weinberg et al. | 714/46 |
| 6,898,556 B2 * | 5/2005 | Smocha et al. | 702/186 |
| 6,901,535 B2 * | 5/2005 | Yamauchi et al. | 714/38.12 |
| 7,197,559 B2 * | 3/2007 | Goldstein et al. | 709/224 |
| 7,526,410 B2 * | 4/2009 | Anastassopoulos et al. | 702/186 |
| 7,533,371 B1 * | 5/2009 | Johns et al. | 717/130 |
| 7,685,272 B2 * | 3/2010 | Bansod et al. | 709/224 |
| 7,698,417 B2 * | 4/2010 | Rizzi et al. | 709/224 |
| 7,720,662 B1 * | 5/2010 | Aldrich | 703/13 |
| 8,087,001 B2 * | 12/2011 | Hoyek et al. | 717/124 |
| 2004/0068560 A1 * | 4/2004 | Oulu et al. | 709/224 |
| 2008/0059625 A1 * | 3/2008 | Barnett et al. | 709/223 |
| 2009/0199160 A1 * | 8/2009 | Vaitheeswaran et al. | 717/124 |

OTHER PUBLICATIONS

Mercury LoadRunner Tutorial, Version 8.1, 2004-2005 Mercury Interactive Corporation.*

* cited by examiner

*Primary Examiner* — Don Wong
*Assistant Examiner* — Daxin Wu (57) ABSTRACT

Monitoring resources of a computing device during testing of software applications provides useful feedback to developers and implementers of the software application. By periodically collecting system counter data during automated testing of the software application, and correlating the collected data to a state of the test, the actions of the test causing any undesirable resource issues can be readily identified.

18 Claims, 6 Drawing Sheets

RESOURCE MONITORING

BACKGROUND

Software development and deployment generally involves testing to insure, to a practical extent, that the software is performing to expectations. Such testing is an important tool, whether creating a new software application or a new version of an existing software application, evaluating whether to install a software application on a system, or evaluating whether to provide general user access to a software application installed on a system.

One common testing category is functional testing. Functional testing is used to determine whether a software application is performing the correct tasks, i.e., that the code behaves the way a user would expect it to behave. Functional testing looks to what a user sees and does not require any knowledge of the actual code involved in providing the user experience.

During functional testing, the software application under test may be run on a representative computer system, i.e., a computer system representative of the expected installation environment, to determine how well that system executes the intended functions of the application. For example, functional testing may evaluate access security, user commands, data input/output/manipulation, user interfaces, etc. Such testing can be used to determine whether a given computer system is expected to have sufficient resources, e.g., processor time, memory, threads, etc., to reliably run the application.

Although testing may be performed manually, it is quite common to utilize a tool to automate the testing. One such tool is the QuickTest Professional software available through Hewlett-Packard Company, Palo Alto, Calif., USA. QuickTest Professional is automated testing software for building functional and regression test suites. Tests can be developed by simply using the target application and recording the user steps performed on the target application, or by simply declaring what steps the tester should perform. Once the test is developed, it can be "replayed" on the target application under a variety of testing conditions, e.g., different computer systems, different levels of competing applications, different versions of code, etc., to help testers identify and report on the effects of the target application. Knowledge of the effects of the target application are useful for those developing the target application as well as those looking to deploy the target application to their user base.

For the reasons stated above, and for other reasons that will become apparent to those skilled in the art upon reading and understanding the present specification, there is a need in the art for alternative methods and apparatus for testing software applications.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

The various embodiments include methods of monitoring system resources during functional testing of software applications on computer systems. In prior solutions, system resource usage could be manually tracked during functional testing, such as by opening Task Manager in a Windows operating system environment. Alternatively, such usage information could be explicitly collected. However, such solutions do not correlate resource usage with the testing state.

Operating systems for computing devices typically provide access to system counters, which report data about processes being performed by the processor of the computing device during operation. System counters are typically specific to each process being performed by the processor. For example, if a processor is running an Application A and an Application B, memory usage for Application A can be reported separately from memory usage for Application B. Some example system counters are provided in Table 1.

TABLE 1

Example System Counters

| Counter Name | Description |
| --- | --- |
| % Processor Time | The percentage of time that the processor is executing a non-Idle thread |
| Memory Usage | The total amount of memory, in MB, used by the process |
| % User Time | The percentage of non-idle processor time spent in user mode |
| % Privileged Time | The percentage of non-idle processor time spent in privileged mode |
| Virtual Bytes | The current size in bytes of the virtual address space the process is using |
| Page File Bytes | The current number of bytes the process has used in the paging file(s) |
| Private Bytes | The current number of bytes the process has allocated that cannot be shared with other processes |
| Page Faults/sec | The overall rate faulted pages are handled by the processor |
| Thread Count | The number of threads currently active in this process |
| Handle Count | The total number of handles currently open by the process |
| GDI Objects | The number of graphics device interface objects used by the process |
| IO Read Operations/sec | The rate the process is issuing read I/O operations |
| IO Write Operations/sec | The rate the process is issuing write I/O operations |
| IO Data Operations/sec | The rate the process is issuing read and write I/O operations |

TABLE 1-continued

Example System Counters

| Counter Name | Description |
| --- | --- |
| IO Other Operations/sec | The rate the process is issuing I/O operations that are neither a read or a write operation. |
| IO Read Bytes/sec | The rate the process is reading bytes from I/O operations |
| IO Write Bytes/sec | The rate the process is writing bytes to I/O operations |
| IO Data Bytes/sec | The rate the process is reading and writing bytes in I/O operations |
| IO Other Bytes/sec | The rate the process is issuing bytes to I/O operations that don't involve data such as control operations |

The various embodiments collect data from one or more system counters during testing of a software application and correlate the collected data to the state of the test at the time the data was collected. For example, an embodiment of the disclosure may collect memory usage and % processor time every second during testing of an application under test. The current state of the test, i.e., what step the test is performing, is also collected during the same period. Collection of the test state can either be performed each time the system counter data is collected, or the run times for each step can be logged such that the current test state for any particular time of the test can be determined. Thus, in this embodiment, the user would be able to determine what amount of memory and what percentage of the processor's time was devoted to the application under test, and what step of the test was being performed at the time the data was collected. Conversely, to continue this example, the user would also be able to select a step of the test and see what amount of memory and what percentage of the processor's time was devoted to the application under test during that step. For a further embodiment, the user can specify limits for the system counters, and deem the test failed if any system counter exceeds its specified limit during testing of the application under test. Upon failure for exceeding a counter limit, the test could either be aborted, or the failure could simply be reported to the user and the test allowed to continue.

Figure 1:
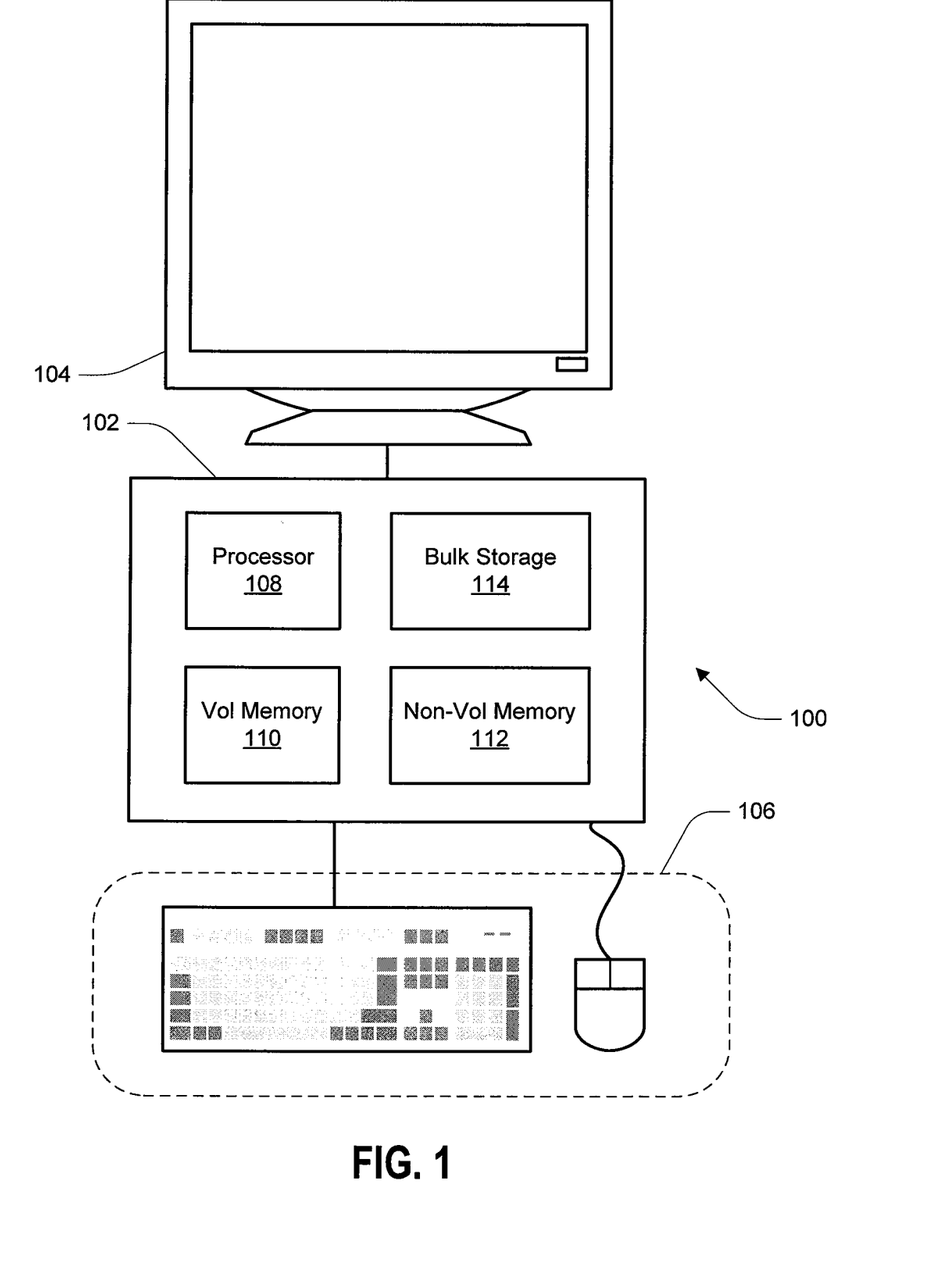
FIG. 1 is a representation of a computer system for use with various embodiments of the disclosure.

FIG. 1 shows an exemplary computer system 100 suitable for testing software applications in accordance with embodiments of the disclosure. The computer system 100 includes a computing device 102, one or more output devices 104 and one or more user input devices 106.

The computing device 102 may represent a variety of computing devices, such as a network server, a personal computer or the like. The computing device 102 may further take a variety of forms, such as a desktop device, a blade device, a portable device or the like. Although depicted as a display, the output devices 104 may represent a variety of devices for providing audio and/or visual feedback to a user, such as a graphics display, a text display, a touch screen, a speaker or headset, a printer or the like. Although depicted as a keyboard and mouse, the user input devices 106 may represent a variety of devices for providing input to the computing device 102 from a user, such as a keyboard, a pointing device, selectable controls on a user control panel, or the like.

Computing device 102 typically includes one or more processors 108 that process various instructions to control the operation of computing device 102 and communicate with other electronic and computing devices. Computing device 102 may be implemented with one or more memory components, examples of which include a volatile memory 110, such as random access memory (RAM); non-volatile memory 112, such as read-only memory (ROM), flash memory or the like; and/or a bulk storage device 114. Common examples of bulk storage devices include any type of magnetic or optical storage device, such as a hard disc drive, a solid-state drive, a magnetic tape, a recordable/ rewriteable optical disc, and the like. The one or more memory components may be fixed to the computing device 102 or removable.

The one or more memory components are computer usable storage media to provide data storage mechanisms to store various information and/or data for and during operation of the computing device 102, and to store machine-readable instructions adapted to cause the processor 108 to perform some function. An operating system and one or more application programs may be stored in the one or more memory components for execution by the processor 108. Storage of the operating system and most application programs is typically on the bulk storage device 114, although portions of the operating system and/or applications may be copied from the bulk storage device 114 to other memory components during operation of the computing device 102 for faster access. One or more of the memory components contain machine-readable instructions adapted to cause the processor 108 to perform methods in accordance with embodiments of the disclosure. For some embodiments, one or more of the memory components contain the software application to be tested.

Automated testing of software applications is well known and will not be detailed herein. Generally, automated testing involves the generation of a testing script, which is a series of actions that might be taken by a user of the software application during use. The testing script might be generated directly, generated in response to a recording mechanism, or generated in response to a guided input of keywords. For example, in a testing script of a flight reservation system in a Windows environment, if the test were to simulate a user requesting a flight schedule from Paris to New York, the script might look something like the following:

Window("Flight Res Main Window").WinComboBox ("Fly From:").Select "Paris"
Window("Flight Res Main Window").WinComboBox ("Fly To:").Select "New York"
Window("Flight Reservation Main Window").WinButton ("Get Flight Schedule").Click Regardless of how the test is generated, however, the resulting automated test is a sequence of steps adapted to cause a processor to run the application under test as if a user were providing input to the application in response to output provided to the user.

For the various embodiments, while an automated test is being performed on an application under test, system counter data is collected for that application and correlated to the state of the test. Such correlation can be performed by either time stamping the collected system counter data, i.e., associating a time of data collection with the collected data, or by associating the collected data with the step being performed by the test at the time of data collection. In this manner, the usage of system resources by the application under test can be tracked throughout the test, and trouble areas, e.g., processor bottleneck or memory leak, can be readily spotted and traced to the particular action of the application that caused, or at least preceded, the problem.

Because system counters are specific to each process being run on the processor, the process to monitor, i.e., the application under test, may be specified in addition to the system counters to monitor. In this manner, the collected data is focused only on the application under test, and not every process of the processor. The system counters to monitor may be selected from any of the system counters available in the operating system in which the application is being tested. Alternatively, the testing software may limit what system counters can be monitored.

Figure 2:
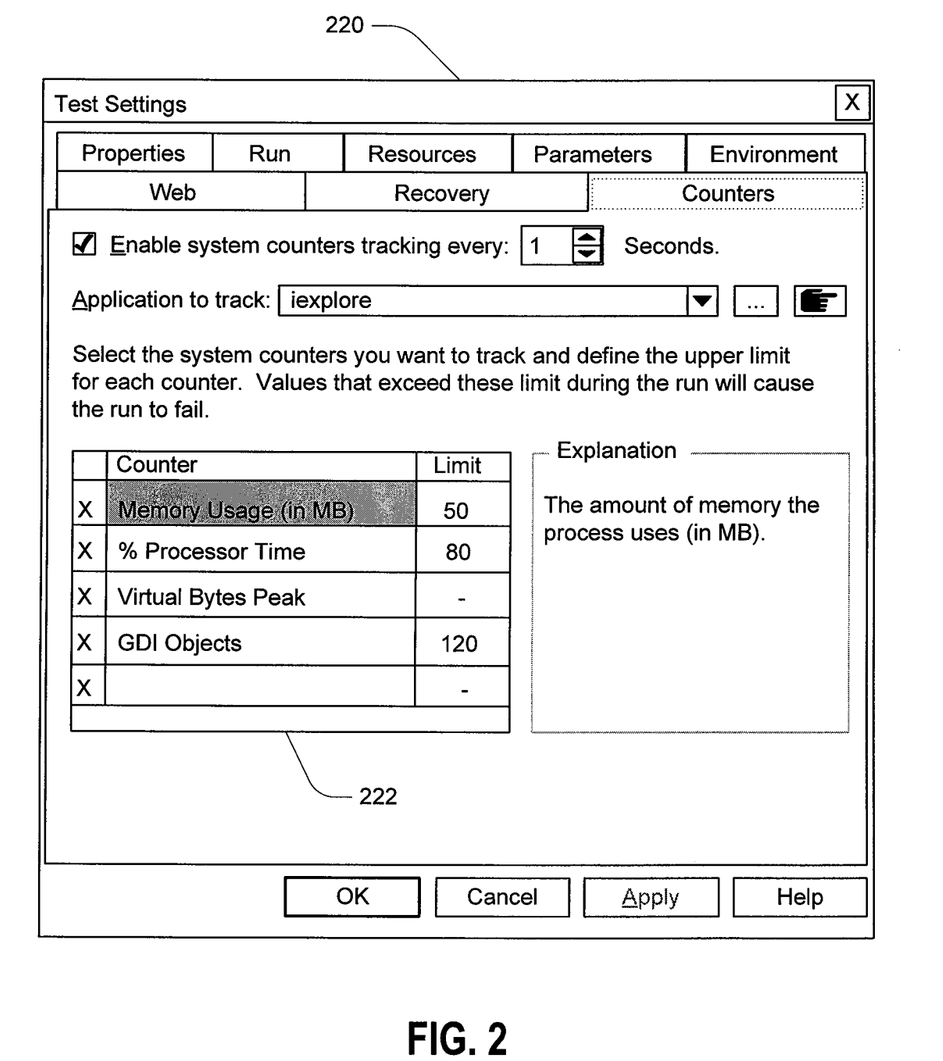
FIG. 2 is an example of a dialog box that might be presented to a user in accordance with an embodiment of the disclosure.

FIG. 2 is an example of a dialog box 220 that might be presented to a user of a computer system for the testing of an application on the system in a Windows environment. The dialog box 220 contains a grid 222 from which the system counters can be selected for monitoring. The system counters presented in the grid 222 may be a predefined set of system counters from which the user can select. However, embodiments of the disclosure permit monitoring of any system counter supported by the computing device. Thus, for one embodiment, all system counters are made available to a user for selection. As an example, with reference to FIG. 2, even if a predefined list of system counters is presented in the grid 222, additional system counters could be made available to a user in response to selecting the blank counter box of grid 222. Note that the grid 222 further contains a column for Limit. A user can input a desired limit for each system counter selected for monitoring. The desired limit represents a value of the system counter above which the test will be deemed to fail. In the example dialog box 220, it can be seen that the process "iexplore" is the application to track. Thus, the system counters selected in the grid 222 for tracking would only apply to the "iexplore" process.

Figure 3:
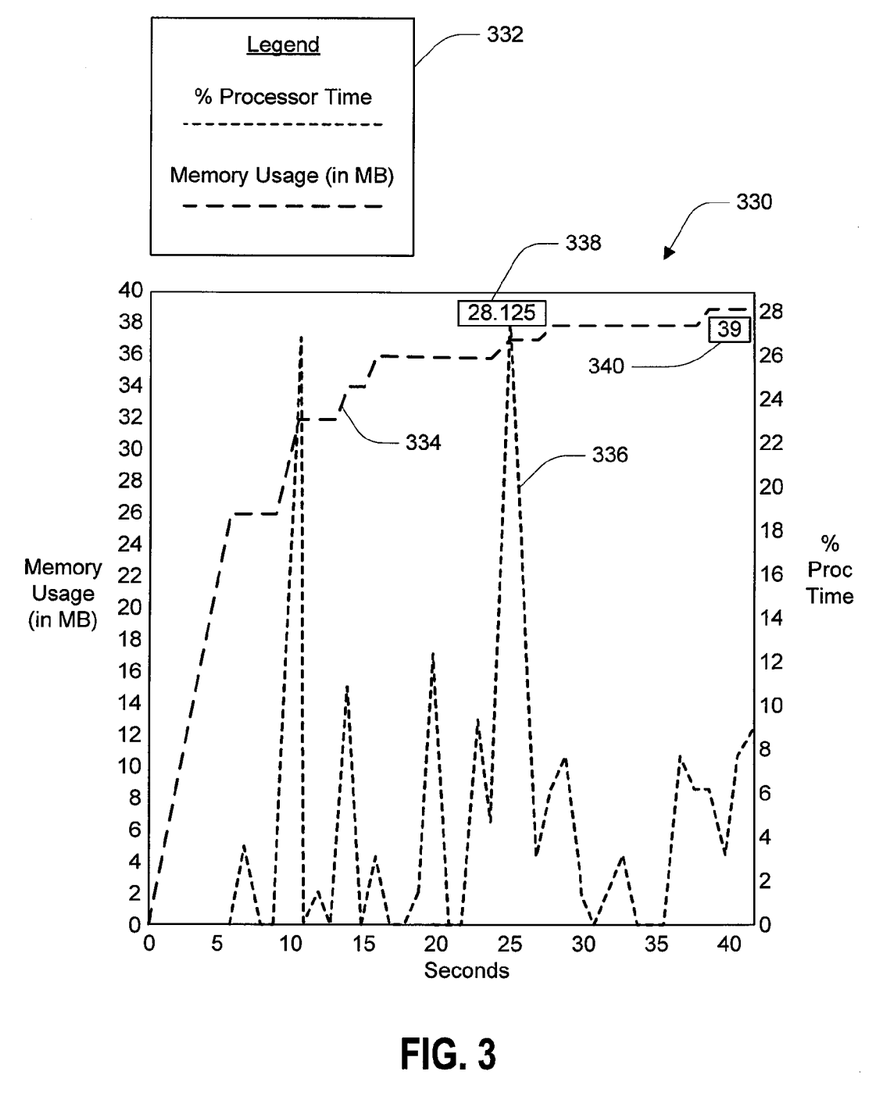
FIG. 3 is an example of output that might be provided to a user in accordance with an embodiment of the disclosure.

FIG. 3 is an example of output 330 that might be provided to a user after performing the automated test on a software application. In the example output 330, two system counters were monitored during the test run, i.e., % Processor Time and Memory Usage (in MB). As shown in legend 332, trace 334 depicts the Memory Usage (in MB) that might occur during an automated test of an application, while trace 336 depicts the % Processor Time that might occur during the automated test. As shown in output 330, maximum values reached by the tracked system counters during the test might be displayed in the output 330, such as maximum 338 of trace 336 and maximum 340 of trace 334. Note that the time 0 on the abscissa of the graph corresponds to the start of the automated test, such that the system counter values are correlated with the state of the test. For example, in the example output 330, the trace 336 (% Processor Time) had a maximum value of 28.125% at about 25 seconds into the test. Thus, by knowing what step the test was performing about 25 seconds after it started, the step of the test leading to the maximum level of processor usage can be determined.

Figure 4:
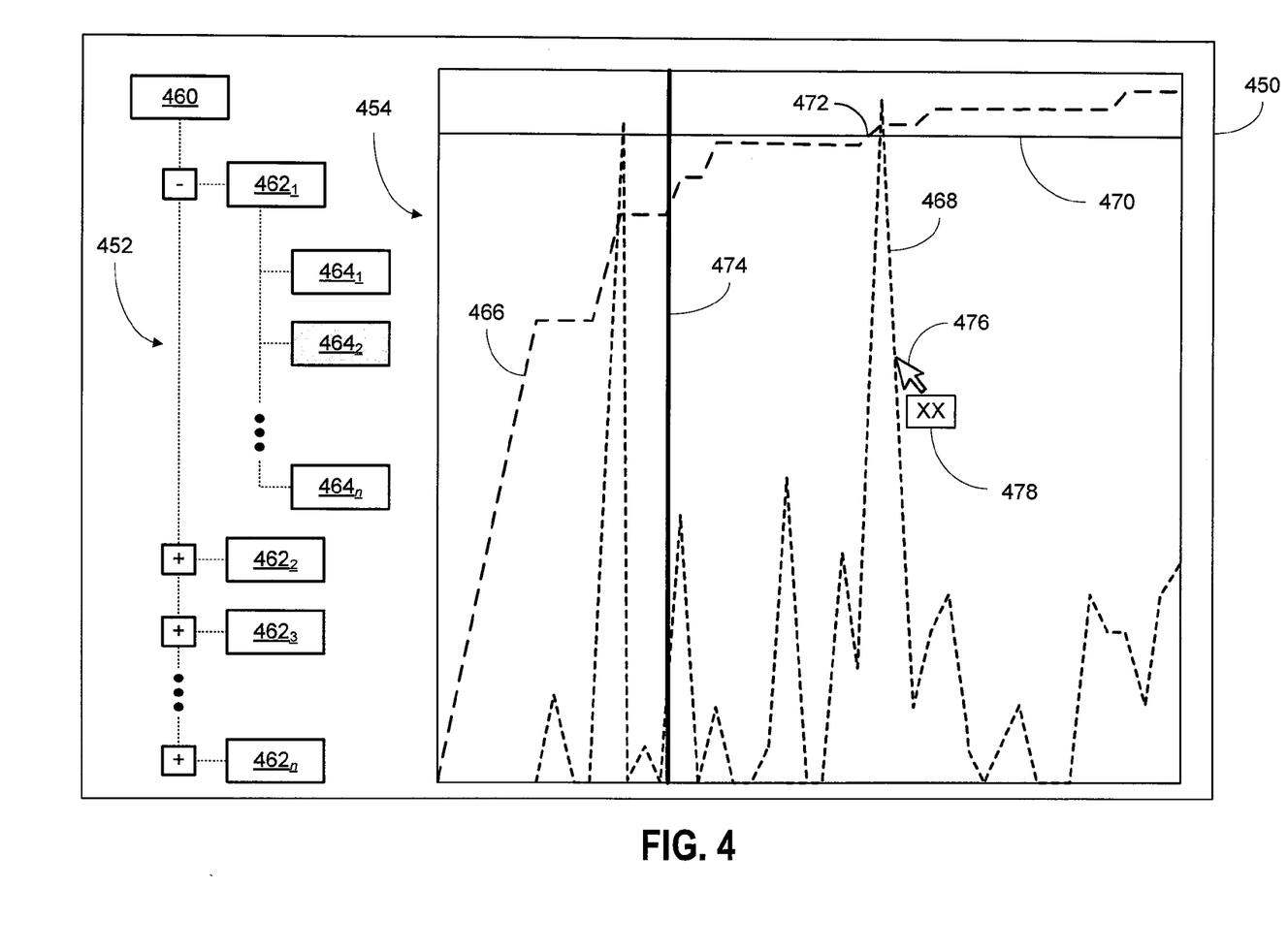
FIG. 4 is another example of output that might be provided to a user in accordance with an embodiment of the disclosure.

FIG. 4 is another example of output 450 that might be provided to a user in accordance with an embodiment of the disclosure. The example output 450 includes an index 452 and a graph 454 as they might be displayed together. Ordinate and abscissa values, and a graph legend, are not depicted in FIG. 4 in order to focus on other aspects of the output 450.

The index 452 provides an indication of the various results 460 of an automated test. The results 460 may be represented as a number of first level results 462 corresponding to different sequential portions of the automated test. For example, a first level results $462_1$ may represent the results obtained during activities involved in obtaining secure access, e.g., logging in, to the application under test, first level results $462_2$ may represent the results obtained during activities involved in entering data into the application under test, first level results $462_3$ may represent the results obtained during activities involved in manipulating data within the application under test, and first level results $462_n$ may represent the results obtained during activities involved in closing or logging out of the application under test. Each first level results 462 may be composed of a number of second level results 464. In the example output 450, first level results $462_1$ is expanded to show its second level results $464_1$ to $464_n$ while the remaining first level results 462 are collapsed. The individual levels of the index 452 each represent the results obtained during one or more steps that could be taken by a user of the application under test. It is noted that the second level results 464 may be further divided into one or more third level results (not shown) and so on until the index 452 has sufficient levels to represent the results obtained from each discrete step of the automated test. The tree structure of index 452 is commonly used in file structures and permits a high-level overview of the results 460 obtained during various portions of the automated test, while allowing the viewing of additional detail as needed. Alternatively, the index 452 may be presented as a simple list (not shown in FIG. 4) of the results obtained from performance of each step of the automated test.

The graph 454 provides the data value traces for one or more system counters being monitored during the test 460. For the graph 454 depicted in FIG. 4, two traces 466 and 468 are depicted. Also depicted in the graph 454 of example output 450 is a system counter limit 470. For this example, the system counter limit 470 represents the desired maximum value of the system counter represented by trace 466. It can be seen in the graph 454 that the system counter limit 470 is exceeded at point 472 of the trace 466. It is noted that each system counter trace can have its own system counter limit. For one embodiment, a system counter limit may use the same color as its corresponding system counter trace in order to facilitate easy identification of its corresponding system counter trace. For distinction, a different hatching or thickness may be used.

Also depicted in the graph 454 of example output 450 is a current step indicator 474. The current step indicator 474 can be placed anywhere in the graph 454 by clicking or otherwise selecting a point in the graph 454. The results level, e.g., 462/464, representing the results of the step of the test corresponding to the current step indicator 474 will be highlighted or otherwise indicated in the index 452. For example, the color or brightness of the second level results $464_2$ is altered from other routines to indicate that it corresponds to the step that occurred at the point in the graph 454 where the current step indicator 474 is placed. For one embodiment, by clicking or otherwise selecting a result from the index 452, the current step indicator 474 is moved to the position in the graph 454 corresponding to the step of the automated test corresponding to the selected result. Thus, a user is able to view the correlation between a step of the automated test, results obtained during that step of the automated test, and resource usage during that step of the automated test. For a further embodiment, a user may position a cursor 476 over any point of any of the system counter traces of the graph 454 to display an indicator 478 of the value of the trace at the position of the cursor 476. Thus, the display of the correlated system counter data is interactive in that placing a cursor over a trace displays a data value of that trace at that point, and selection of a point in the graph 454 provides an indication of the corresponding step in the index 452 and vice versa.

Figure 5:
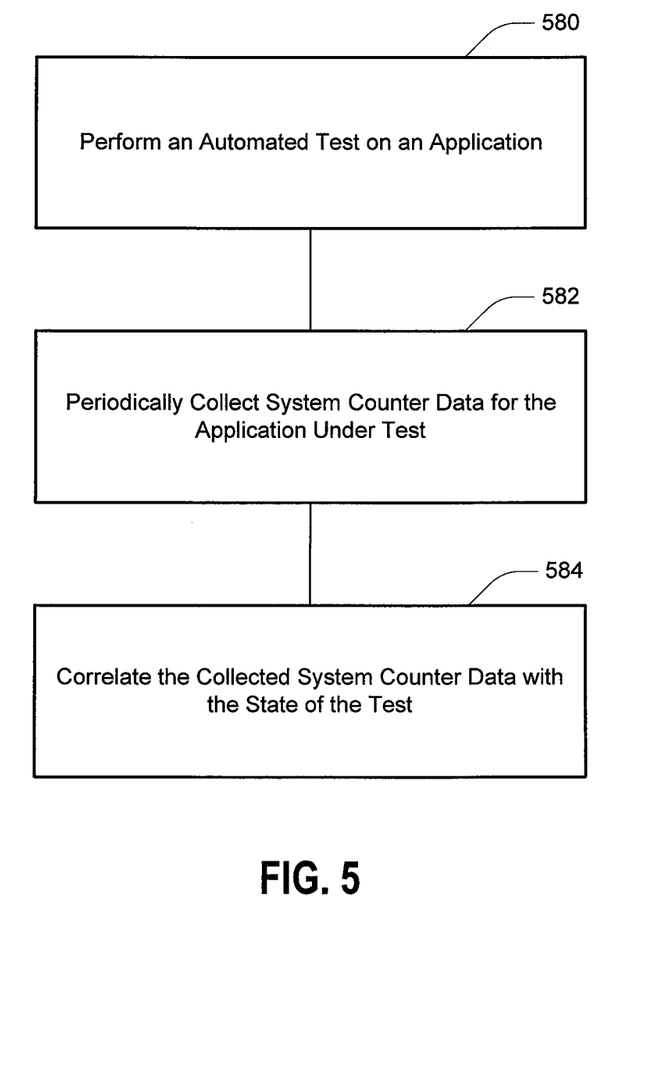
FIG. 5 is a flow chart of a method of monitoring resources of a computing device in accordance with an embodiment of the disclosure.

FIG. 5 is a flow chart of a method of monitoring resources of a computing device in accordance with an embodiment of the disclosure. At 580, an automated test is performed on an application. The automated test is performed on a computing device as a sequence of steps simulating the activity of a user of the application. At 582, system counter data is periodically collected for the application under test. A user of the computing device specifies, prior to performing the automated test, a periodicity of the data collection, the process name of the application under test and the system counters to be monitored for the application under test. At 584, the collected system counter data is correlated with the state of the test at the time of data collection. For example, the computing device can take a snapshot of the system time of the computing device along with the current step of the automated test and the values of the system counters to be monitored each time a data point is desired, from the beginning of the automated test until its completion. For example, if the desired periodicity is to collect data every two seconds, the system time, the current step of the test and the current values of the selected system counters could be stored every two seconds, starting when the automated test was initiated and ending when the automated test runs to completion.

Figure 6:
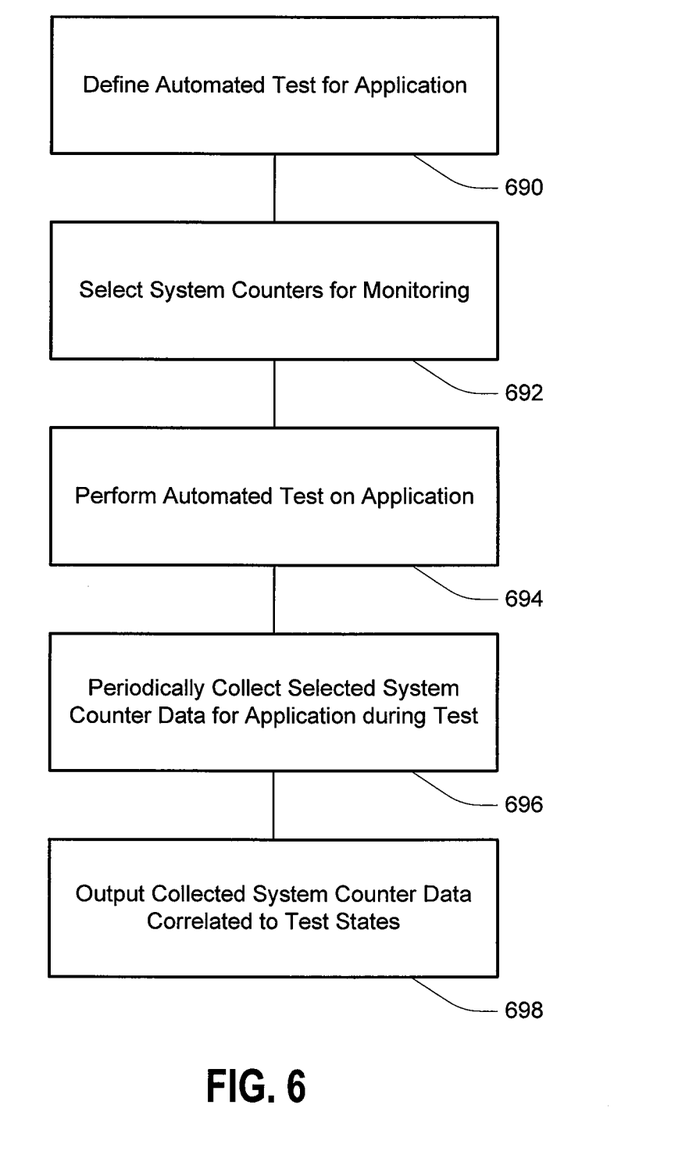
FIG. 6 is a flow chart of another method of monitoring resources of a computing device in accordance with an embodiment of the disclosure.

FIG. 6 is a flow chart of another method of monitoring resources of a computing device in accordance with an embodiment of the disclosure. At 690, an automated test is defined for testing a software application on a computing device. As noted above, this can be through the direct writing of script, or through the use of a guided development process. At 692, one or more system counters of the computing device are selected for monitoring. The selected system counters are the system counters for the application to be tested. At 694, the automated test is performed on the application. At 696, selected system counter data is periodically collected for the application during the test. At 698, collected system counter data correlated to states of the test are output to a user. For one example, a display of interactive output as described with reference to FIG. 4 might be provided to a user.

Although specific embodiments have been illustrated and described herein it is manifestly intended that the scope of the claimed subject matter be limited only by the following claims and equivalents thereof.

What is claimed is:

1. A method of monitoring resources of a computing device, comprising:
    performing an automated test on a software application, wherein the automated test comprises a sequence of steps to cause a processor of the computing device to provide input to the application under test;
    periodically collecting system counter data for the application under test for a period of the automated test;
    correlating the collected system counter data with a step of the automated test being performed at a time the system counter data was collected;
    providing a graph comprising one or more traces of data values of system counters of the collected system counter data and comprising an index of results obtained during steps of the automated test;
    in response to selecting a position within the one or more traces of data values, providing an indication in the index of results of a particular result corresponding to a step of the automated test that occurred at the selected position; and
    in response to selecting a result within the index of results, providing an indication in the one or more traces of data values of where a step of the automated test corresponding to the selected result occurred.

2. The method of claim 1, further comprising selecting system counters for which data is to be periodically collected.

3. The method of claim 2, wherein selecting system counters for which data is to be periodically collected comprises selecting system counters from all system counters available in an operating system of the computing device.

4. The method of claim 1, further comprising displaying a data value for a system counter in response to placing a cursor over a trace of the data for that system counter.

5. The method of claim 1, further comprising:
    defining a limit for at least one system counter for which data is being collected; and
    deeming the automated test failed if the system counter data for the at least one system counter exceeds its limit while performing the automated test.

6. A method of monitoring resources of a computing device, comprising:
    defining an automated test for a software application, wherein the automated test comprises a sequence of steps to cause a processor of the computing device to provide input to the software application;
    selecting system counters for monitoring during the automated test;
    performing the automated test on the software application;
    periodically collecting selected system counter data for the application under test; and
    providing output of the collected system counter data correlated to a step of the automated test being performed at a time the system counter data was collected;
    in response to selecting data of the collected system counter data from the output, providing an indication of a particular step of the automated test that occurred when the selected data was collected; and
    in response to selecting a step of the automated test from the output, providing an indication of data of the collected system counter data that was collected at a time of the selected step.

7. The method of claim 6, wherein defining an automated test for a software application comprises defining a sequence of steps to be performed on the software application to simulate user input to the software application.

8. The method of claim 6, wherein selecting system counters for monitoring comprises selecting system counters from a predefined list of system counters.

9. The method of claim 6, further comprising:
    defining limits for one or more of the selected system counters; and
    deeming the automated test failed in a collected data value for any system counter exceeds its limit during the automated test.

10. A computing device, comprising:
    a processor; and
    a storage media containing machine-readable instructions adapted to cause the processor to perform a method of testing a software application by the computing device, comprising:
        selecting system counters for the software application for monitoring;
        performing an automated test on the software application, wherein the automated test comprises a sequence of steps to cause the processor to provide input to the software application;
        periodically collecting data from the selected system counters during the automated test;
        providing output of the collected system counter data correlated to a step of the automated test being performed at a time the system counter data was collected;
        in response to selecting data of the collected system counter data from the output, providing an indication of a particular step of the automated test that occurred when the selected data was collected; and
        in response to selecting a step of the automated test from the output, providing an indication of data of the collected system counter data that was collected at a time of the selected step.

11. The computing device of claim 10, wherein the storage media further contains the software application to be tested.

12. The computing device of claim 10, wherein the method further comprises defining the automated test comprising a sequence of steps to simulate user input to the computing device while running the software application.

13. The computing device of claim 12, wherein providing output of the collected system counter data correlated to a step of the automated test comprises providing output of the collected system counter data correlated to a step of the automated test being performed at a time of data collection.

14. The computing device of claim 10, wherein providing output of the collected system counter data correlated to a step of the automated test comprises providing interactive output of the collected system counter data.

15. A computer system, comprising:
 means for testing a software application by the computer system, wherein testing the software application comprises performing a sequence of steps to cause a processor of the computer system to provide input to the software application;
 means for collecting system counter data for the application under test;
 means for correlating the collected system counter data to a step of the test being performed at a time of data collection;
 means for providing interactive output of the correlated system counter data;
 means for providing an indication of a step of the test being performed when particular data of the collected system counter data was collected in response to selecting the particular data from the interactive output; and
 means for providing an indication of data of the collected system counter data that was collected at a time of a particular step of the test being performed in response to selecting the particular step from the interactive output.

16. The computer system of claim 15, wherein the means for collecting system counter data for the application under test further comprises means for selecting which system counters of the computer system for the software application will be monitored.

17. The computer system of claim 15, further comprising means for defining limits for the collected system counter data and for providing an indication of failure if a limit is exceeded for any of the collected system counter data.

18. The computer system of claim 15, wherein the means for providing interactive output of the correlated system counter data comprises means for identifying a step of the test being performed at the time of data collection for the collected system counter data.

* * * * *